US012354054B2

(12) United States Patent
Wyckoff et al.

(10) Patent No.: US 12,354,054 B2
(45) Date of Patent: Jul. 8, 2025

(54) METHODS AND SYSTEMS FOR IDENTIFYING AND REPLACING POTENTIAL FAILURE POINTS IN A LOGISTICS NETWORK

(71) Applicant: The Boeing Company, Arlington, VA (US)

(72) Inventors: Nicholas M. Wyckoff, Arlington, VA (US); Richard J. Thompson, Arlington, VA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/304,658

(22) Filed: Apr. 21, 2023

(65) Prior Publication Data
US 2024/0354692 A1    Oct. 24, 2024

(51) Int. Cl.
*G06Q 10/0835*    (2023.01)
(52) U.S. Cl.
CPC .............................. *G06Q 10/08355* (2013.01)
(58) Field of Classification Search
CPC ......... G06Q 10/08355; G06Q 10/0832; G06Q 10/0833; G06N 20/00
See application file for complete search history.

(56) References Cited

U.S. PATENT DOCUMENTS

| 2020/0081445 | A1* | 3/2020 | Stetson | .................... G06F 18/23 |
| 2020/0348662 | A1* | 11/2020 | Cella | ................ G05B 19/41865 |
| 2020/0394709 | A1* | 12/2020 | Cella | ...................... G06N 3/042 |
| 2021/0042530 | A1* | 2/2021 | Kim | ...................... G06F 18/214 |
| 2021/0133670 | A1* | 5/2021 | Cella | ...................... G06N 3/044 |

OTHER PUBLICATIONS

Chaug-Ing Hsu, Vehicle routing problem with time-windows for perishable food delivery, 2007, p. 465-466 (Year: 2007).*

* cited by examiner

*Primary Examiner* — Ibrahim N El-Bathy
(74) *Attorney, Agent, or Firm* — Alleman Hall & Tuttle LLP

(57) ABSTRACT

A computer-implemented method includes receiving information of a logistics network representing a factory and associated suppliers of parts, evaluating a first transit time required to receive parts across the logistics network, for each supplier of the associated suppliers creating a digital copy of the logistics network in which a node connecting the supplier to the factory is removed from the digital copy of the logistics network, evaluating a second transit time required to receive parts, for a supplier of the associated suppliers having an impact metric above a threshold identifying a substitute supplier that ships to the factory in the logistics network, and in an event of failure of a given node in the logistics network, replacing in the logistics network a given supplier that uses the given node to ship to the factory and that has an associated impact metric above the threshold with the substitute supplier.

20 Claims, 10 Drawing Sheets

METHODS AND SYSTEMS FOR IDENTIFYING AND REPLACING POTENTIAL FAILURE POINTS IN A LOGISTICS NETWORK

FIELD

The present disclosure relates generally to receiving and evaluating information of a logistics network, and more particularly, to preparing for an event of failure of a given node in the logistics network by identifying replacements for given suppliers at certain nodes.

BACKGROUND

A logistics supply chain generally refers to different processes involved in moving goods or products from an origin to a destination. Several issues can occur with a supply chain including inefficient transportation (e.g., poor route planning, unreliable carriers, and inadequate infrastructure), inventory management (e.g., inaccurate demand forecasting), lack of real-time information about a status of goods in transit, quality and assurance issues (e.g., theft or damage to goods), and ineffective communication all of which can lead to delays and increased costs.

Addressing supply chain issues requires a combination of technology, process improvement, and effective communication between all parties involved in the logistics chain. However, planning contingencies for all possible problems may be unrealistic. What is needed is a way to identify substitutes within the supply chain at various or important nodes to help mitigate any issues that arise.

SUMMARY

In an example, a computer-implemented method is described comprising receiving information of a logistics network representing a factory and associated suppliers of parts needed for manufacture of units of production at the factory, and the logistics network includes nodes and edges and wherein suppliers that ship to the factory are interconnected by the nodes and edges in the logistics network with the factory. The method also comprises assigning metadata to the logistics network by correlating data from a source indicating travel conditions across the logistics network, evaluating a first transit time required to receive parts, from the associated suppliers, needed for manufacture of the units of production at the factory across the logistics network, and for each supplier of the associated suppliers, creating a digital copy of the logistics network in which a node connecting the supplier to the factory is removed from the digital copy of the logistics network and any associated edges of the node are trimmed. The method also comprises for each digital copy of the logistics network, evaluating a second transit time required to receive parts needed for manufacture of the units of production at the factory, calculating an impact metric of each supplier of the associated suppliers as a difference between the first transit time and the second transit time, for a supplier of the associated suppliers having an impact metric above a threshold, identifying a substitute supplier that ships to the factory in the logistics network, and in an event of failure of a given node in the logistics network, replacing in the logistics network a given supplier that uses the given node to ship to the factory and that has an associated impact metric above the threshold with the substitute supplier.

In another example, a computer-implemented method is described comprising receiving information of a logistics network representing a factory and associated suppliers of parts needed for manufacture of units of production at the factory, and the logistics network includes nodes and edges and wherein suppliers that ship to the factory are interconnected by the nodes and edges in the logistics network with the factory. The method also comprises assigning metadata to the logistics network by correlating data from a source indicating travel conditions across the logistics network, evaluating a first transit time required to receive parts, from at least one supplier of the associated suppliers, needed for manufacture of the units of production at the factory across the logistics network using a first path, for the at least one supplier of the associated suppliers, creating digital copies of the logistics network in which each successive digital copy has a different node connecting the at least one supplier to the factory removed from the digital copy and any associated edges of the node are trimmed, for each digital copy of the logistics network, evaluating a second transit time required to receive parts, from the at least one supplier, needed for manufacture of the units of production at the factory, calculating an impact metric of each node removed as a difference between the first transit time and the second transit time, and for a node having an impact metric above a threshold, identifying a substitute path from the at least one supplier to the factory in the logistics network that avoids the node.

In still another example, a non-transitory computer-readable media is described having stored therein executable instructions, which when executed by a computing device including one or more processors causes the system to perform functions. The functions comprise receiving information of a logistics network representing a factory and associated suppliers of parts needed for manufacture of units of production at the factory, and the logistics network includes nodes and edges and wherein suppliers that ship to the factory are interconnected by the nodes and edges in the logistics network with the factory. The functions also comprise assigning metadata to the logistics network by correlating data from a source indicating travel conditions across the logistics network, evaluating a first transit time required to receive parts, from at least one supplier of the associated suppliers, needed for manufacture of the units of production at the factory across the logistics network using a first path, for the at least one supplier of the associated suppliers, creating digital copies of the logistics network in which each successive digital copy has a different node connecting the at least one supplier to the factory removed from the digital copy and any associated edges of the node are trimmed, for each digital copy of the logistics network, evaluating a second transit time required to receive parts, from the at least one supplier, needed for manufacture of the units of production at the factory, calculating an impact metric of each node removed as a difference between the first transit time and the second transit time, and for a node having an impact metric above a threshold, identifying a substitute path from the at least one supplier to the factory in the logistics network that avoids the node.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of illustrative examples of the present disclosure when read in conjunction with the accompanying drawings.

DETAILED DESCRIPTION

Figure 1:
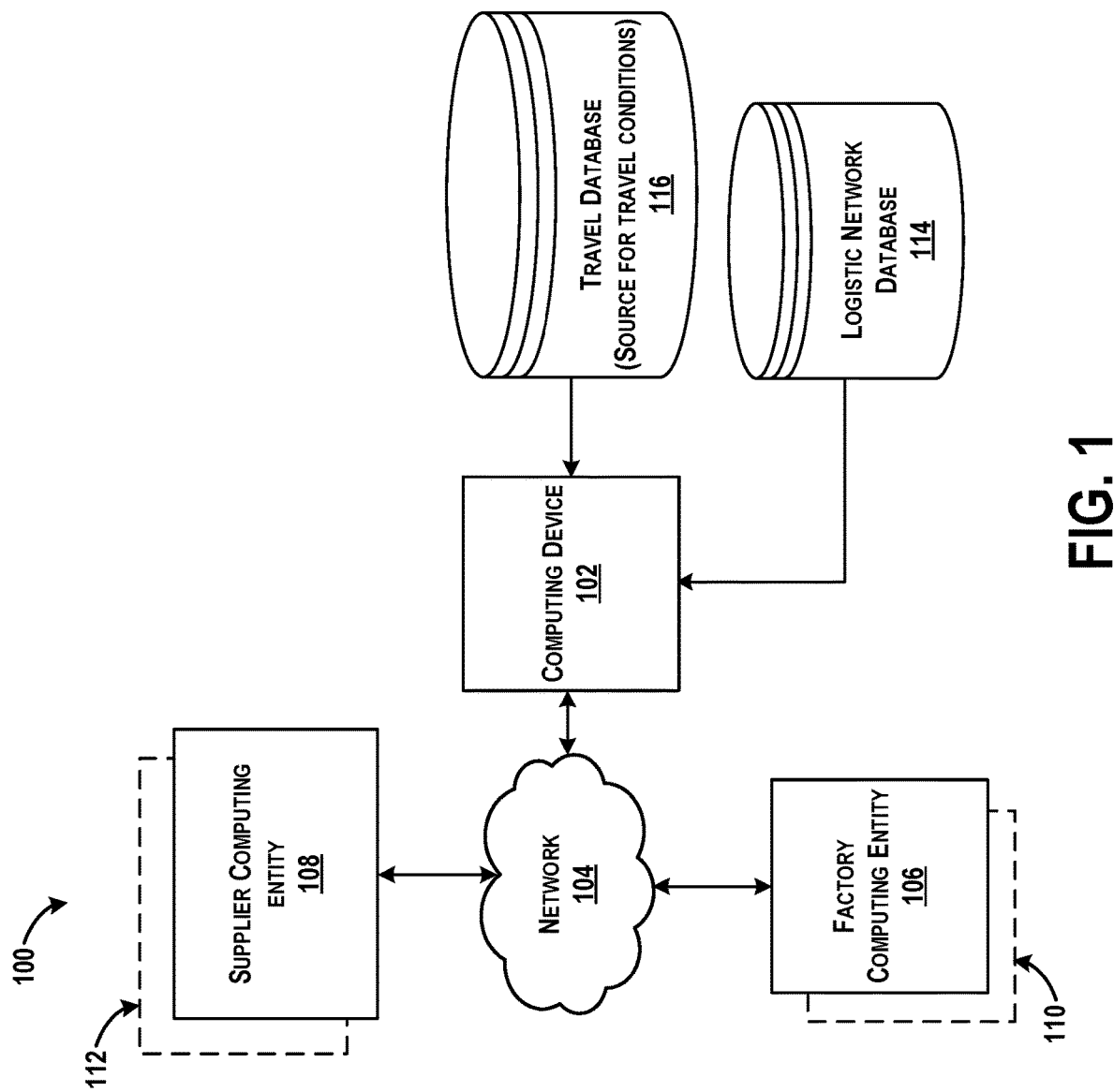
FIG. 1 illustrates an example of a system, according to an example implementation.

Disclosed examples will now be described more fully hereinafter with reference to the accompanying drawings, in which examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems are described that discover and identify nodes of a greatest weakness or a greatest impact to a change in a logistics network. The logistics network may take many forms, and in examples includes a supply chain network composed of factories requiring parts shipped from various suppliers, quarries, depots, or other sources across a potentially large transportation network. The transportation network includes roads, railways, ports, bridges, airports, etc., and novel methods and systems are executed to identify which nodes that, if failed or unavailable for transport due to whatever cause (weather, labor strike, unexpected maintenance, natural disaster, part shortage, etc.), would cause a greatest change in a metric of interest (e.g., total transit time to receive all parts for manufacture, total cost incurred to ship all parts, total number or rate of parts being shipped to factories from suppliers, etc.). Methods are executed in a programmatic manner to either minimize or maximize a selected metric (e.g., minimize the total transit time or cost, or perhaps maximize the number/rate of supplies being shipped to the factory). Thus, identification of the nodes causing a greatest change in the metric (e.g., incur greatest increase in minimum transit time or minimum cost, or incur greatest decrease of the number of supplies available) is used for simulations as well as for backup planning.

In one example, computer-implemented methods include evaluating a first transit time required to receive parts, from associated suppliers, needed for manufacture of units of production at a factory across the logistics network. Then, for each supplier of the associated suppliers, methods include creating a digital copy of the logistics network in which a node connecting the supplier to the factory is removed from the digital copy of the logistics network and any associated edges of the node are trimmed. For each digital copy of the logistics network, a second transit time required to receive parts needed for manufacture of the units of production at the factory is evaluated, and an impact metric of each supplier of the associated suppliers is calculated as a difference between the first transit time and the second transit time. Any supplier that is found to have an impact metric above a threshold is flagged as a node representative of having a capability of causing a largest change in the selected metric, and thus, a substitute supplier that ships to the factory in the logistics network for the identified supplier is found. As a result, in an event of failure of a given node in the logistics network, methods include replacing in the logistics network a given supplier that uses the given node to ship to the factory and that has an associated impact metric above the threshold with the substitute supplier.

Examples described herein consider a reverse of a problem that is frequently addressed, in which instead of seeking to identify a fastest route (or shortest path) to optimize and improve a given logistics network, example methods identify a node and/or nodes in the logistics network that would cause a largest impact to a desired metric.

Implementations of this disclosure thus provide technological improvements that are particular to computer technology, for example, those concerning evaluating logistics networks representative of supply chain networks. Computer-specific technological problems, such as determining nodes in the network being a weak point and proactively identifying a substitution, can be wholly or partially solved by implementations of this disclosure. For example, implementation of this disclosure allows for supply chain weakness to be identified for planning purposes to enable substitute suppliers to be lined up for use if needed.

The systems and methods of the present disclosure further address problems particular to computer networks, for example, those concerning remote monitoring of supply chain networks. For example, a central computing entity can monitor aspects of the network that are changing in real-time to further evaluate weak points in the network. Implementations of this disclosure can thus introduce new and efficient improvements in the ways in which suppliers are selected for distribution of parts to factories, for example.

Referring now to the figures, FIG. 1 illustrates an example of a system 100, according to an example implementation. The system 100 includes a computing device 102 accessible through a network 104 by multiple different entities including a factory computing entity 106 and a supplier computing entity 108. In examples, while one supplier computing entity 108 and one factor computing entity 106 are depicted in FIG. 1, it should be understood that this is merely an example, and systems according to the present disclosure can include any suitable number of associated computer entities, such as a second (or more) factory computing entity 110 and a second (or more) supplier computing entity 112.

The factory computing entity 106 and the supplier computing entity 108 are remotely located from the computing device 102, in some examples, such as being located at physical or geographic locations of an associated supplier or factory, which can include brick and mortar locations, mobile locations, or virtually at on-line locations.

In the system 100, the network 104 (e.g., Internet) provides access to the computing device 102 for all network-connected components. In some examples, more components of the system 100 may be in communication with the network 104 to access the computing device 102. Communication with the computing device 102 and/or with the network 104 may be wired or wireless communication (e.g., some components may be in wired Ethernet communication and others may use Wi-Fi communication). In still further examples, the network 104 provides access for the computing device 102 to communicate with all network-connected components directly as well.

The system 100 enables a method for evaluating a logistics network, such as to identify potential weakness areas in the logistics network and determine possible substitutes. In one example, the system 100 identifies a node (or an ordered set of nodes) in the logistics network that, if removed from the logistics network or experienced a failure, would cause an impact above a threshold to a selected metric or a change to a specified cost function of interest. A cost function is selectable to represent a logistical value, such as time to complete a unit of production of a specific type, etc.

The system 100 includes a logistic network database 114 to which the computing device 102 is in communication for retrieving information of different logistics networks. In one example, the logistics network represents a factory and associated suppliers of parts needed for manufacture of units of production at the factory. The logistics network includes road networks in contested areas, geographic tunnel or corridor systems, routing networks, ports, seaways, canals, airports, rail systems, and bridges for all multi-modal transport of parts to the factory, for example. Thus, the logistics network takes into account geographical networks of varying conditions and other features that are represented as one-dimensional routes. The logistics network is represented as interconnected nodes and edges and suppliers that ship to the factory are interconnected by the nodes and edges in the logistics network with the factory, for example.

The system 100 includes a travel database 116 to which the computing device 102 is in communication for receiving data including travel conditions across the logistics network, such as traffic related data associated with travel routes or weather related data associated with the travel routes, for example. Additional data may be aggregated from the travel database 116 onto a model of the logistic network to include the weather effects or a status of contested areas, and roadway, railway, sea conditions, etc.

The computing device 102 receives the information of different logistics networks and evaluates the logistics networks, such as to determine substitute suppliers for use in an event of failure of a given node in the logistics network, and then to replace an associated node in the logistics network with the substitute to generate a representation of a modified logistic network. The representations of the modified logistics networks are stored either locally on the computing device 102 or in a remote database for use if needed. In this manner, operations at a factory can continue uninterrupted (or substantially uninterrupted) in the event that a node in the logistics network for the factory experiences an issue or a failure by the computing device 102 accessing or retrieving an appropriate modified logistics network.

Figure 2:
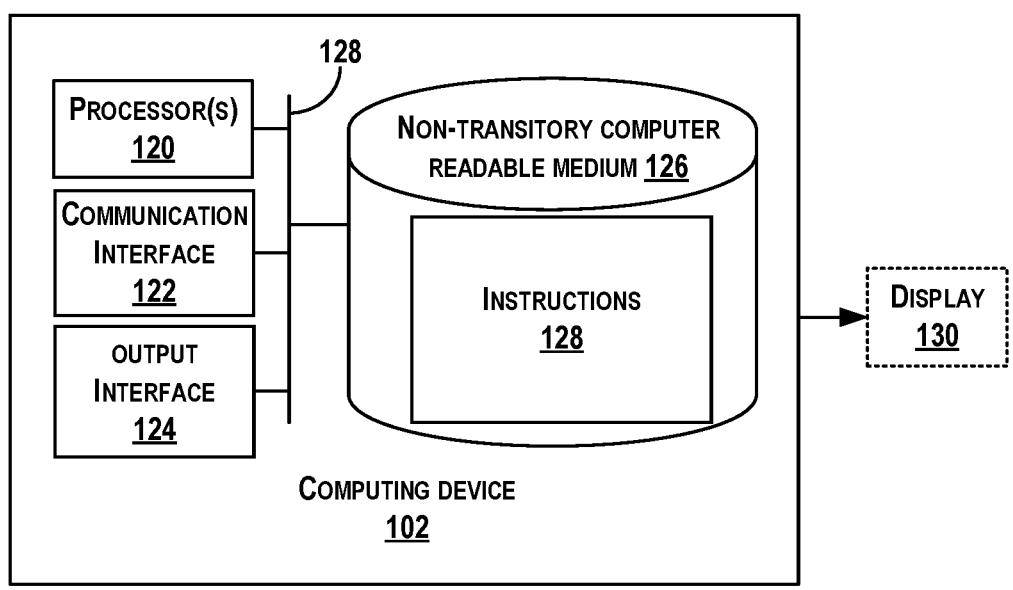
FIG. 2 illustrates an example of the computing device, according to an example implementation.

FIG. 2 illustrates an example of the computing device 102, according to an example implementation. To perform the functions noted above, the computing device 102 includes a one or more processors 120, a communication interface 122, an output interface 124, and non-transitory computer readable medium 126 (e.g., memory), and each component of the computing device 102 is connected to a communication bus 128. The computing device 102 may also include hardware to enable communication within the computing device 102 and between the computing device 102 and other devices (not shown). The hardware may include transmitters, receivers, and antennas, for example.

The one or more processors 120 may be general-purpose processors or special purpose processors (e.g., digital signal processors, application specific integrated circuits, etc.). The one or more processors 120 may receive inputs from the communication interface 122, and process them to generate outputs that are stored in the non-transitory computer readable medium 126. The one or more processors 120 can be configured to execute instructions 128 (e.g., computer-readable program instructions) that are stored in the non-transitory computer readable medium 126 and are executable to provide the functionality of the computing device 102 described herein.

The communication interface 122 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 122 may be configured to receive input data from one or more devices, and may also be configured to send output data to other devices.

The output interface 124 outputs information for reporting or storage, and thus, the output interface 124 may be similar to the communication interface 122 and can be a wireless interface (e.g., transmitter) or a wired interface as well.

The non-transitory computer readable medium 126 may take the form of computer memory, such as one or more computer-readable storage media that can be read or accessed by the one or more processors 120. The computer-readable storage media can include volatile and/or non-volatile storage components, such as optical, magnetic, organic or other memory or disc storage, which can be integrated in whole or in part with the one or more processors 120. In some examples, the non-transitory computer readable medium 126 is implemented using a single physical device (e.g., one optical, magnetic, organic or other memory or disc storage unit), while in other examples, the non-transitory computer readable medium 126 is implemented using two or more physical devices.

The non-transitory computer readable medium 126 is thus a computer readable medium, and the instructions 128 are stored thereon. The instructions 128 include computer executable code.

FIG. 2 also includes a display 130, and the computing device 102 and/or the processors 120 are operable to output data to the display, such as data indicative of the logistics network for example.

Figure 3:
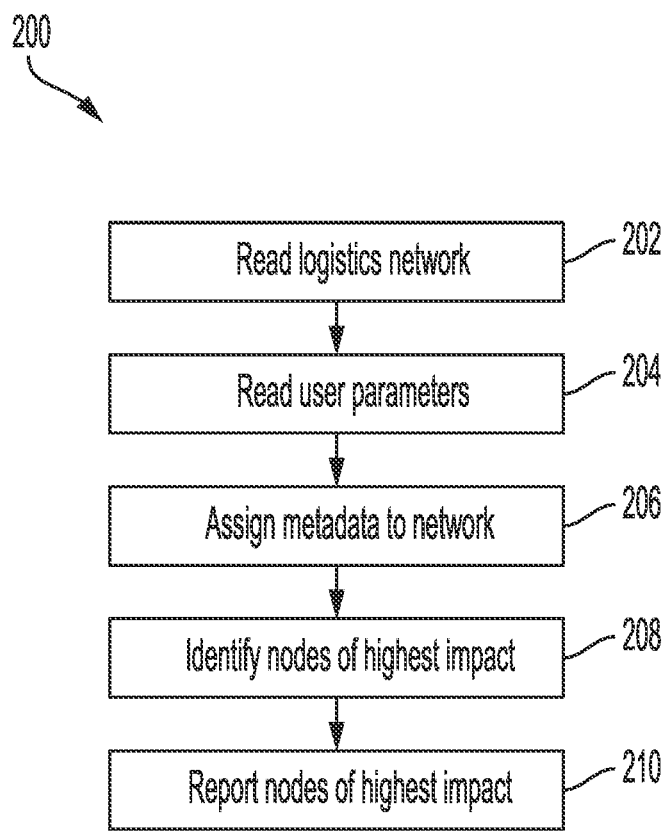
FIG. 3 shows a flowchart of an example of a method for evaluation and modification of a logistics network, according to an example implementation.

FIG. 3 shows a flowchart of an example of a method 200 for evaluation and modification of a logistics network, according to an example implementation. Method 200 shown in FIG. 3 presents an example of a method that could be used with the system 100 shown in FIG. 1, or with the computing device 102 shown in FIGS. 1 and 2, for example. Further, devices or systems may be used or configured to perform logical functions presented in FIG. 3. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

Thus, within examples, functions shown in the flowchart of FIG. 3 take the form of the instructions 128 that are executable by the one or more processors 120 of the computing device 102 to carryout and perform the functions.

In addition, each block or portions of each block in FIG. 3, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes the computing device 102 reading a logistics network, such as by access to the logistic network database 114. Additional pre-processing steps may be performed as well if a logistics network were to be scraped from a satellite image or other source, for example. Thus, reading the logistics network includes via reading in a file containing network node/edge data, querying a database, or by image analysis of an aerial photograph of a geographic territory, for example.

At block 204, the method 200 includes the computing device 102 reading user parameters. In examples, users provide parameters, such as factories and suppliers for the logistics network, and any additional operating parameters for consideration. The user parameters include a desired maximal period to produce/mobilize/migrate units across the network, any regions that should be avoided, or any eliminated or unnecessary nodes/edges to not consider, for example.

At block 206, the method 200 includes the computing device 102 assigning metadata to the logistics network. For example, any metadata accessed from the travel database 116 is added to the network, such as further pre-processing to correlate traffic or weather data from the external database to the logistics network by location.

At block 208, the method 200 includes the computing device 102 identifying nodes of highest impact to a cost function metric of interest. At block 210, the method 200 includes the computing device 102 reporting nodes of highest impact (and possibly any supplemental information from the calculation of these nodes) to the user.

Within examples, the method 200 is executed to read in the logistics network in a form of a network representation composed of nodes and edges, with possible values, conditions, or attributes on each node or edge. For geographic cases, the nodes represent supply depots, warehouses, factories, silos, materials sources, laboratories, workshops, testing facilities, or other structures. Edges connecting the nodes represent roads, routes, bridges, railways, tunnels or underground passages, walkways, trenches, pipelines or other adjacency paths, and each edge could additionally be characterized by a specified condition, quality, and/or speed of travel under various conditions. Additionally, the logistics network solved could be an identified subset or sub-graph of an available known network.

Given such a network of nodes and edges, example methods identify which node (or nodes) if removed from the logistics network would have an impact above a threshold amount. As mentioned, example implementations include an interface to permit users to specify nodes and/or edges of interest or importance, or other conditions and constraints. The system would then publish a set of nodes that meet the specified conditions via a network flow solver and integer optimizer.

Figure 4:
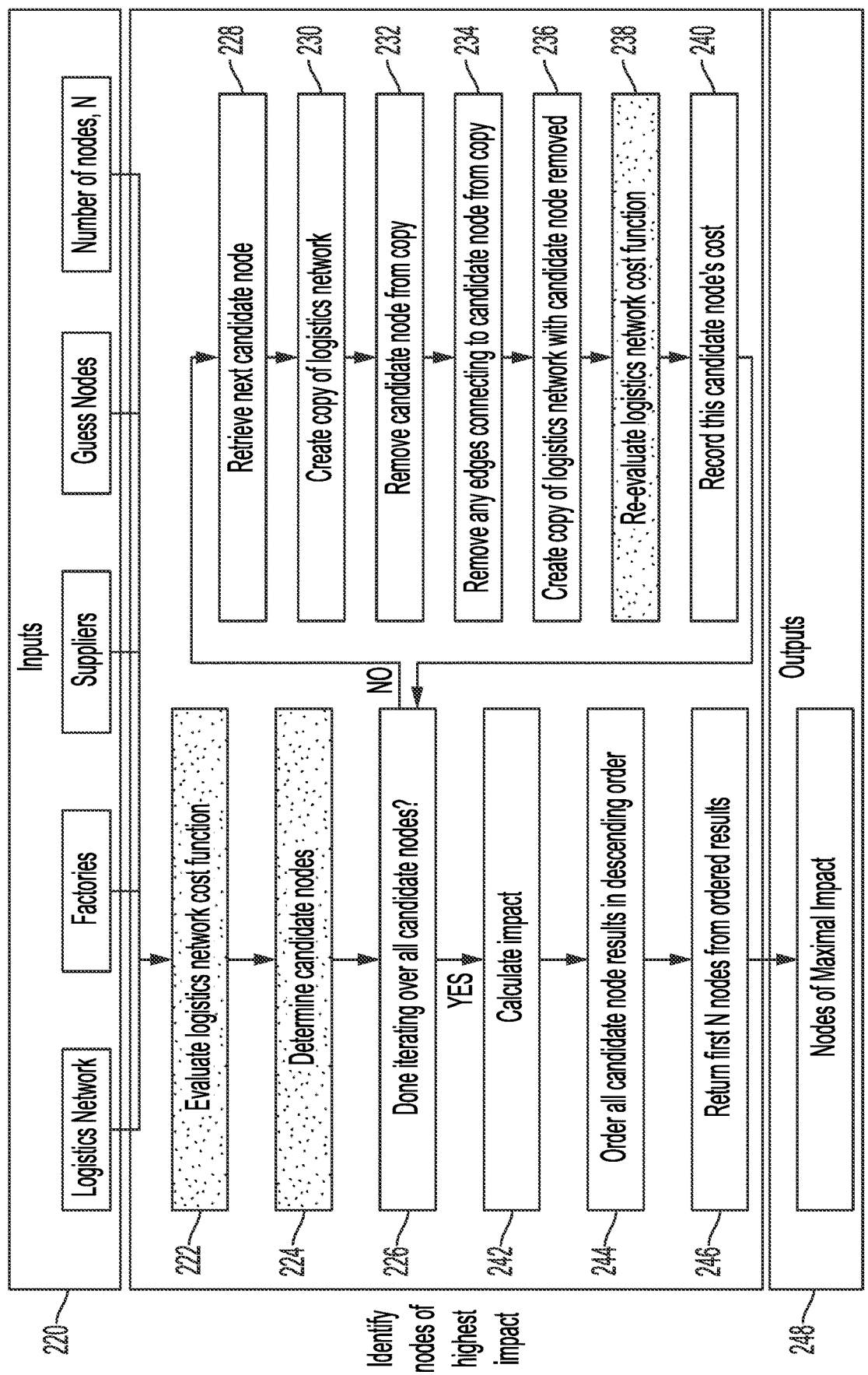
FIG. 4 is a workflow diagram illustrating example operations for identifying nodes of a highest impact, according to an example implementation.

FIG. 4 is a workflow diagram illustrating example operations for identifying nodes of a highest impact, according to an example implementation. In FIG. 4, inputs 220 are received by the computing device 102 including the logistics network information arranged as nodes and edges, information about factories, information about suppliers (including positions in the network and which suppliers ship to which factories), and optional parameters of guess nodes and desired number of nodes of highest impact to extract, for example.

To identify nodes having a highest impact, a logistic network cost function is evaluated of the initial network at block 222, which will be used to compare impact of a failure point. The cost function may take many forms due to a desired metric being evaluated. In one example, the cost function considers a total transit time required to receive all parts needed for manufacture of a single unit of production. In another example, the cost function considers a total expense required to ship all parts needed for a manufacture of a single unit. In another example, the cost function considers a total number or amount of supply units being shipped to a factory from supplier depots.

After the initial cost function is determined and recorded, a set of candidate nodes to examine for potential failure is determined at block 224. The function for generating the candidate nodes is described in greater detail with respect to FIG. 5 below. The function begins with an empty set of candidate nodes. If any user-provided guess nodes have been provided, then these nodes are added.

Next, an iteration is performed over all paths from factories to suppliers shipping to the factories at block 226. For each factory/supplier pair, an optimal least-cost path is computed from the supplier to the factory. A subset of nodes along this least-cost path is chosen to be added to the candidate node list. In a deepest exploration, this subset would be the full set of nodes on the least-cost path. In other examples, a decimated sample (e.g., every nth node along the path having removed the first p and last q nodes on the path first, or alternately a number of randomly sampled nodes) will be used for the subset.

The iteration process includes retrieving a next candidate node (block 228), creating a digital copy of the logistics network (block 230), removing the candidate node from the digital copy (block 232), removing any edges connecting to the candidate node from the digital copy (block 234), outputting the modified digital copy (block 236), re-evaluating the logistics network cost function (block 238), and recording the cost of the candidate node (block 240).

Thus, for each candidate node, a copy of the logistics network is created and the candidate node itself is removed from the network copy. Any edges that connect to the candidate node within the copy network are also trimmed. The updated network copy is re-evaluated for cost function with this candidate node (and connected edges) removed. The resulting cost function is recorded for this candidate node.

Once iterations are completed over all candidate nodes, impacts of each node are calculated at block 242. Impact for a candidate node is calculated as the difference between the initial cost function and the cost function calculated for the candidate node.

Following, the results for the candidate nodes are ordered in descending order at block 244, and a first N nodes from the ordered list are returned at block 246. In this example, the first N results from the sorted list are taken, where N is the number of nodes desired by the user. These N results represent the set of nodes that, if failed or removed from the network, would inflict the greatest impact on the logistics network. These nodes are reported to the user.

The computing device 102 then outputs nodes of a maximal impact at block 248.

Figure 5:
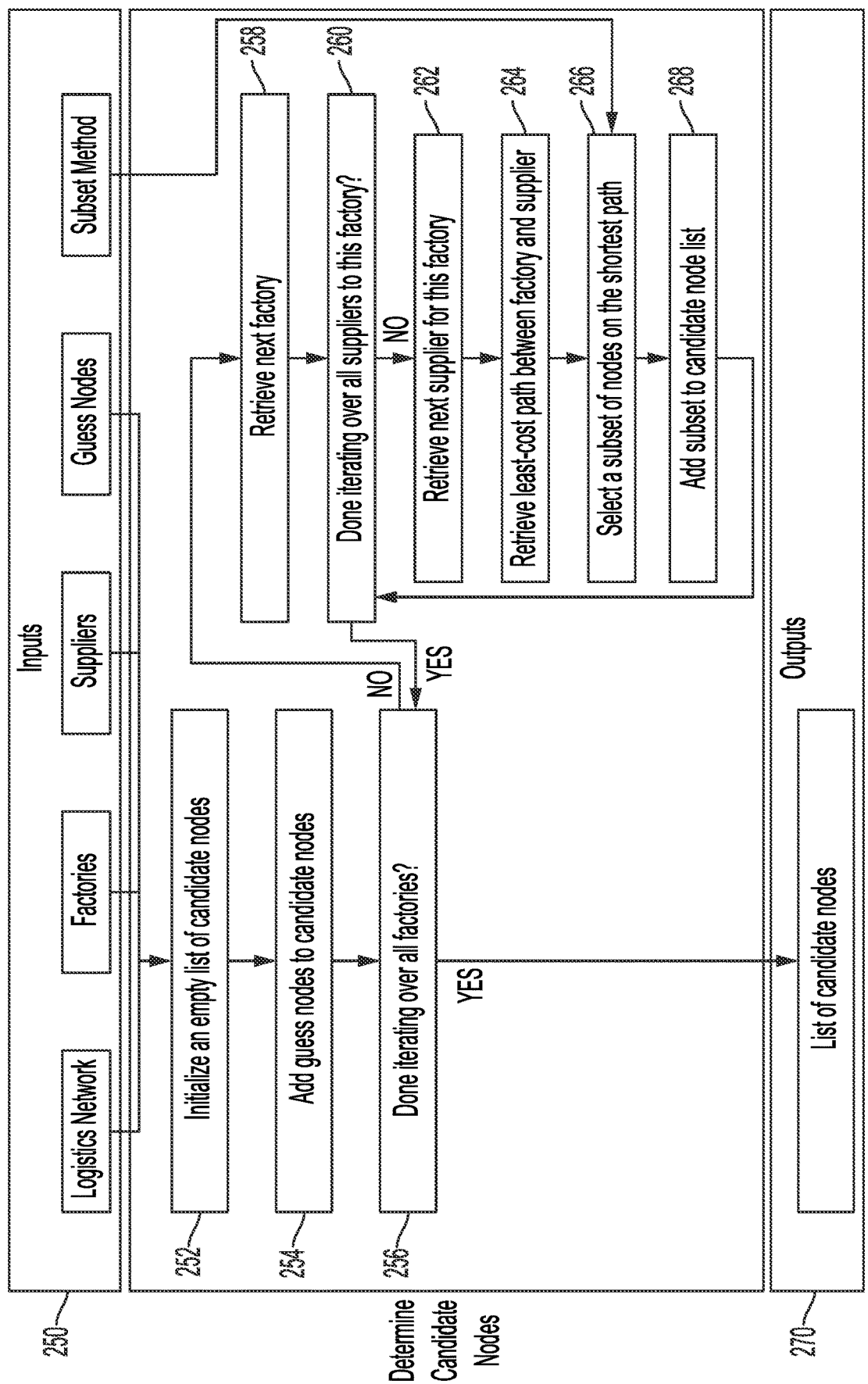
FIG. 5 is a workflow diagram illustrating example operations for determining candidate nodes as noted in FIG. 4, according to an example implementation.

FIG. 5 is a workflow diagram illustrating example operations for determining candidate nodes as noted in FIG. 4, according to an example implementation. In FIG. 5, inputs 250 are the same as in in FIG. 4 and may optionally further include a subset of nodes input. At block 252, an empty list of candidate nodes is initialized, and at block 254 the guess nodes are added to the list. Iterations are then performed over all factories at block 256 to consider impact of the nodes.

Iterations include retrieving a next factory (block 258), performing iterations (block 260) to retrieve a next supplier for the factor (block 262), retrieve a least-cost path between factory and supplier (block 264), select a subset of nodes on the shortest path (block 266), and add the subset to the candidate node list (block 268). Once iterations are completed, all nodes determined are output as a list of candidate nodes (block 270).

Figure 6:
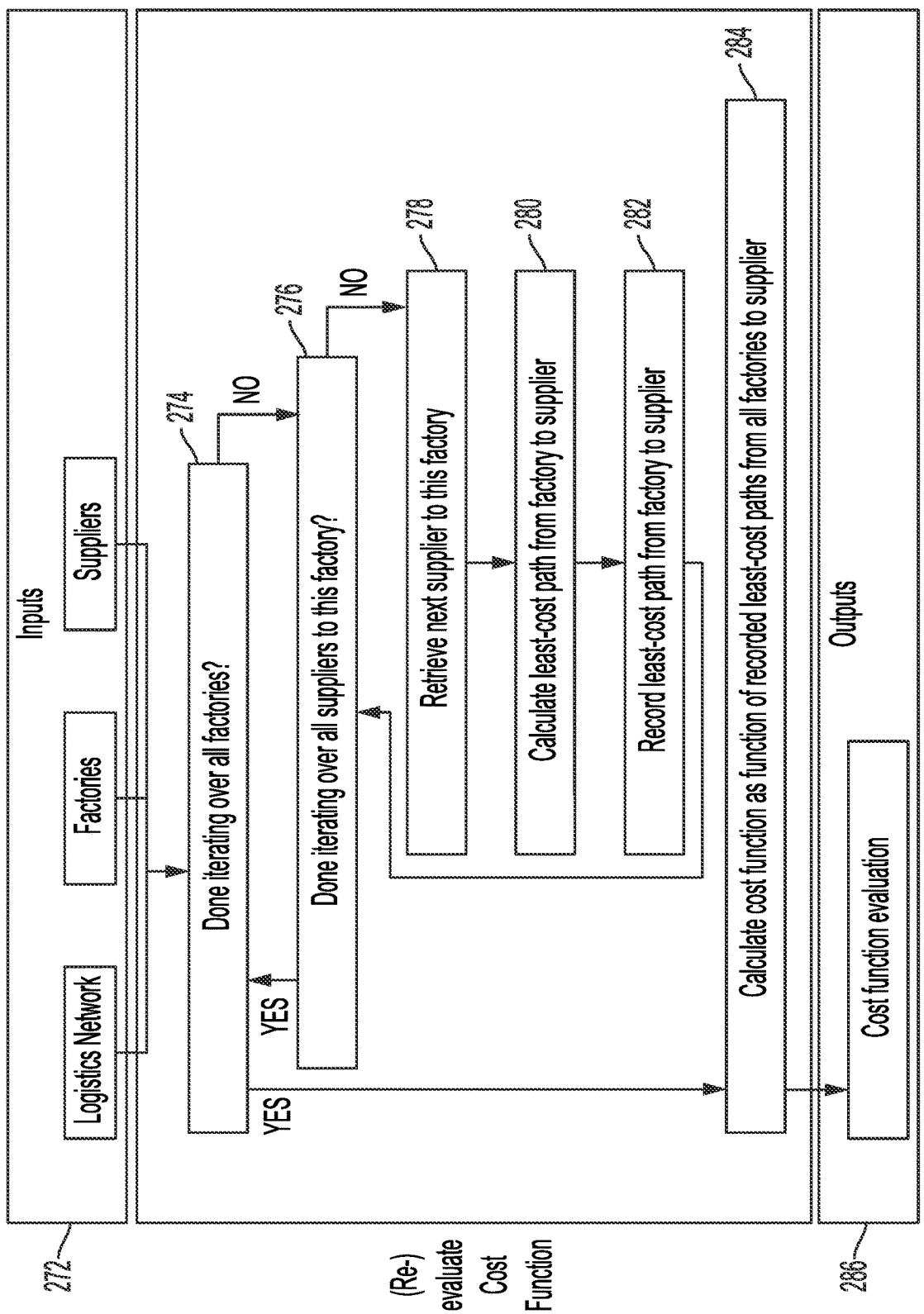
FIG. 6 is a workflow diagram illustrating example operations for evaluating the logistics network cost function as noted in FIG. 4, according to an example implementation.

FIG. 6 is a workflow diagram illustrating example operations for evaluating the logistics network cost function as noted in FIG. 4, according to an example implementation. In FIG. 6, input 270 are the same as previously. Functions include initiating performance of an iteration across all factories in the logistics network, at block 274. For each factory, a set of associated suppliers that ship parts to that factory are identified, at block 276. For each supplier shipping to the factory at block 278, a least-cost optimal path is calculated from the supplier to the factory at block 280. A least-cost path optimal path solution could be solved in a number of ways, but requires solution of a separate optimization problem specific per factory/supplier pair. A cost of the least-cost optimal path is recorded for the given supplier/factory pair, at block 282. A total cost function is then calculated as a function of the least-cost optimal path solutions for all factory/supplier pairs, at block 284. The computing device 102 then outputs a cost function evaluation, at block 286.

Examples functions shown in FIG. 6 are performed both for evaluating the initial cost function for the initial logistics network layout, and for any subsequent re-evaluation performed during the identification of the nodes of highest impact.

Within examples, an actual form of the total cost function is dependent on the cost function metric to be evaluated. For example, if the user selects a cost function of total expense of shipping all parts needed for a manufacture, then the total cost function is calculated as the sum of the cost for all least-cost optimal paths for all factory/supplier pairs. If instead the total time is required, then the total cost function may be calculated as the maximum (or supremum) cost from all least-cost optimal paths for all factory/supplier pairs.

It should be noted that additional complexity could be added to the cost function evaluation step above. For example, if a number of various possible suppliers or supply depots for a part are available to a factory, then an additional step could be added to determine the optimal supplier/depot first, and then calculate the optimal least-cost path from the best supplier/depot to the factory.

In another example, the cost function for selecting optimal supplier could also be different from the cost function used for other suppliers. For example, the supplier could be selected based on nearest distance, availability, or cheapest part cost, but total transit time may be the cost function of interest to be evaluated. This may lead to a number of possibly coupled optimization problems that must be solved per factory/supplier pair within the iteration step of FIG. 4.

Example 1: Application to a Railway Network with Single Supplier

In an example, methods and systems described herein are applied to a rail network. In this example, the logistics network of interest contains nodes representing points or stations along railway tracks, and edges represent track connections from one point/station to another.

Figure 7:
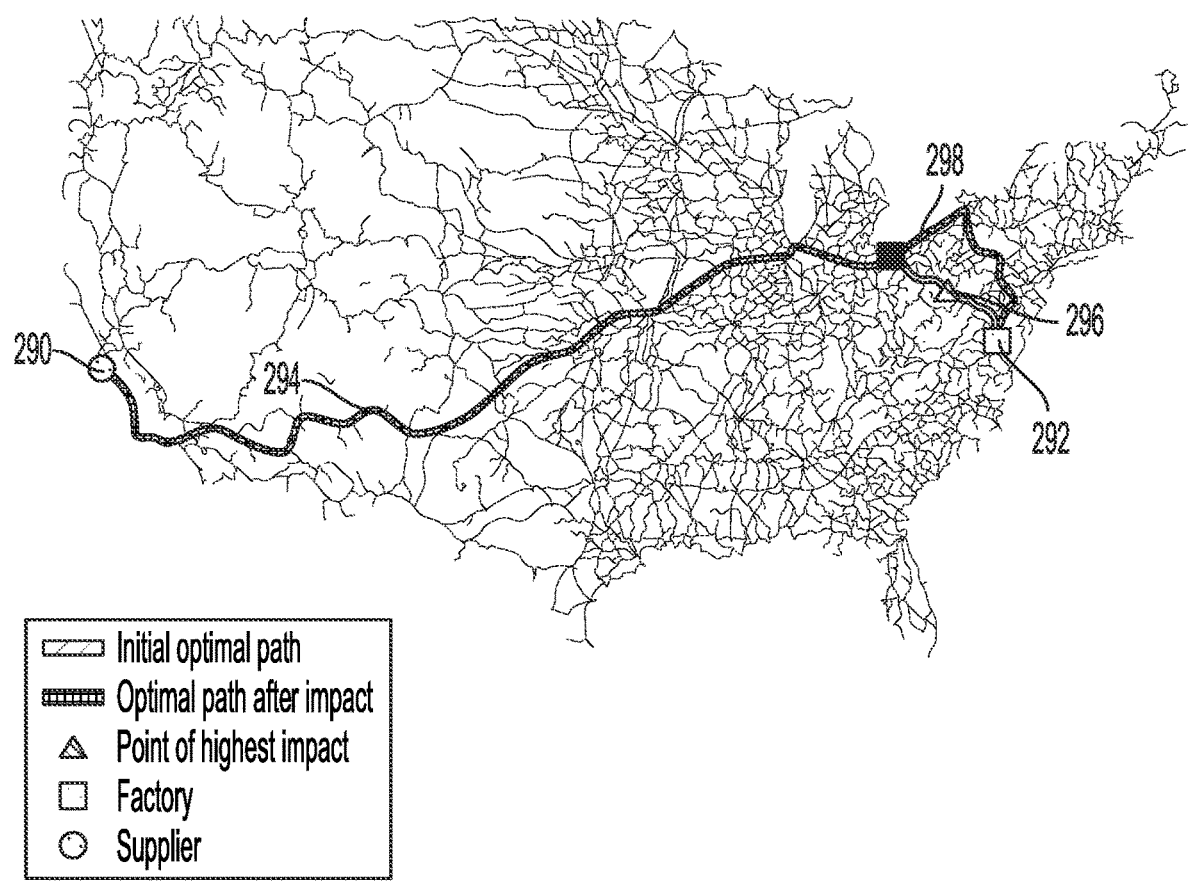
FIG. 7 illustrates a conceptual view of a geographic area for a railway network represented with edges and nodes, according to an example implementation.

FIG. 7 illustrates a conceptual view of a geographic area for a railway network represented with edges and nodes, according to an example implementation. As a first instance, taking a railway network in the United States, consider a case where a supplier 290 on the West Coast sends parts required for manufacture to a factory 292 near the East Coast. In this example, only one factory and supplier are needed, and only one route is considered across the network.

A best possible route 294 is shown in FIG. 7. Applying the method described herein, point locations of the supplier 290 and the factory 292 are input for the logistics network for evaluation. Consider one node of highest failure is desired, and the subset method chosen is random sampling. A cost function of interest here is transit time required from the supplier 290 to the factory 292, which is desired to be minimized, but for which a failure in a point along the optimal path shall incur an increase in the transit time needed. A point of highest impact is identified in FIG. 7 as a triangle 296. After impact and removal of the point 296, a resulting new best possible path 298 is shown. The point identified is considered the point of highest impact because a difference between an initial optimal-route transit time (along the route 294) and transit time along the new optimal path 298 after failure is highest if this point fails.

Example 2: Application to a Railway Network with Multiple Suppliers

Figure 8:
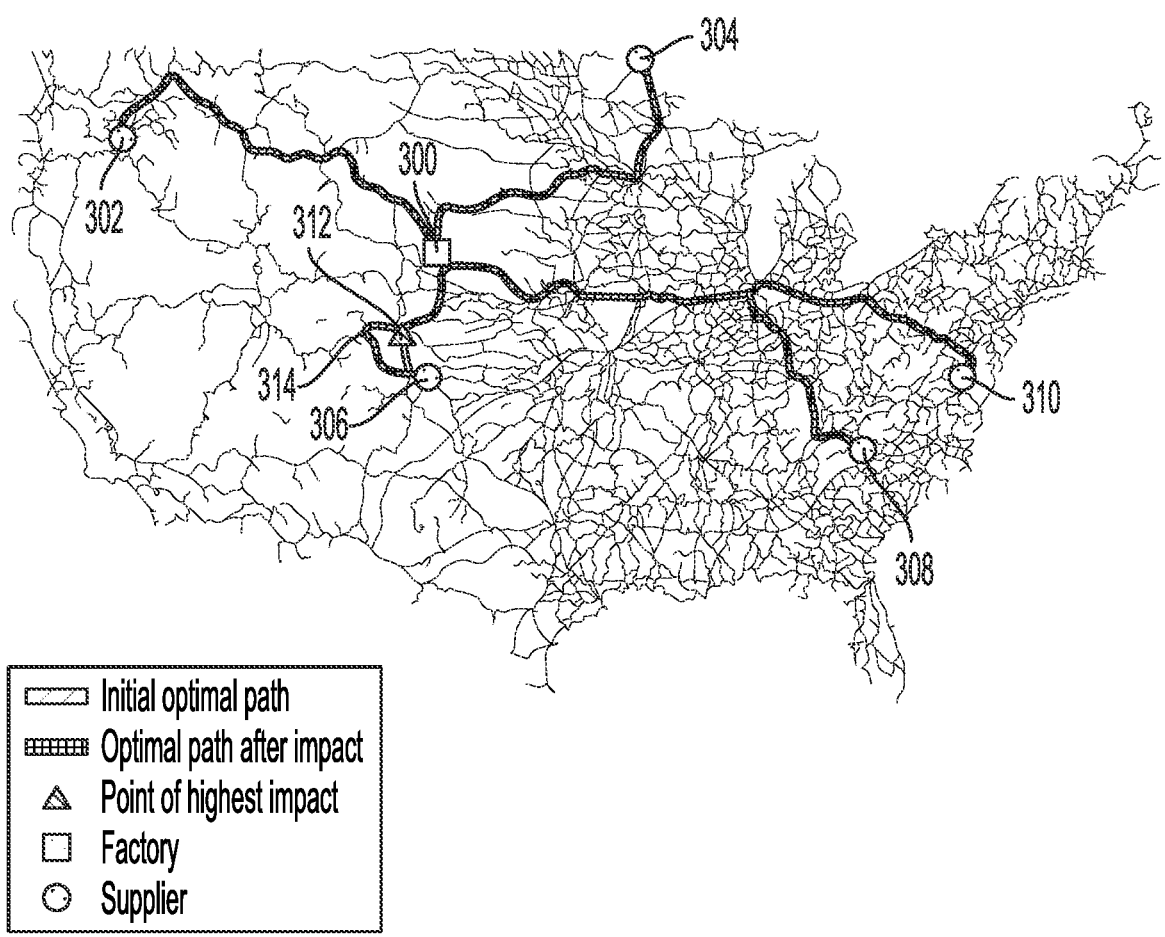
FIG. 8 illustrates a conceptual view of the geographic area for the railway network represented with edges and nodes with multiple suppliers, according to an example implementation.

FIG. 8 illustrates a conceptual view of the geographic area for the railway network represented with edges and nodes with multiple suppliers, according to an example implementation. In a more complex example, the above scenario is considered still with only a single factory 300, but with multiple suppliers 302, 304, 306, 308, and 310 shipping required parts to the factory. In this example, the factory 300 is positioned near a central mid-west region in the United States, and the five suppliers are located across different regions of the United States. It is desired to minimize a total transit time required for all parts to arrive to the factory 300 (which would be a maximum time from all least-cost optimal paths from suppliers to the factory). Initial optimal routes are shown from the factories to the suppliers. Applying example methods described herein, the logistics network is process to identify which single node that, if fails or is unavailable for railway transit, would cause a largest increase in a new transit time required. In this example, a node 312 of highest impact is identified, which causes a greatest increase in this transit time. A new optimal path arrangement from all suppliers to the factory is shown, which only modifies a path from the supplier 306 to the factory 300 to a new optimal path 314 in the case that this node fails.

A yet more complex example could further be constructed in a case including multiple factories with potentially separate supplier depots available at different locations across the country.

In still other examples, additional levels of complexity are introduced to add constraints to the least-cost optimal path selection representing restrictions on roads available due to shipping restrictions, speed limits, traffic, maintenance, etc. Constraints could also be added if parts require certain handling (e.g., cannot be shipped via certain modes of transportation). In some examples, the cost function evaluation also includes handling for cases where disconnected subgraphs occur, such as removal of an edge that results in no possible transit route from one point to another across the network of interest. It may be of interest to the user to record and include cases of disconnected subgraphs in the cost function, or it may be desired to simply exclude such possibilities from the calculation. An ordering of all candidate nodes could additionally include handling for duplicates, such as if multiple nodes are identified with the same impact, and the user could specify if duplicates are allowable or not of interest. Finally, optimal least-cost paths themselves may be of interest as well, and may be desired in the output as well.

Examples of the Cost Function

Within examples, it is desired to identify a node (or an ordered set of nodes) that if removed from the logistic network would cause a greatest impact or change to a specified objective function. The objective function here could represent any logistical value, such as time to complete a unit of production of a specific type, etc.

An algorithm to solve the objective function could be formulated in many different ways. A solver uses an integer optimization formulation to calculate the result. One example of implementation includes (i) assigning a logistical value to each node in the network, (ii) creating a set of Boolean variables representing the availability of each node, (iii) initializing the availability variables all to an initial state, (iv) calculating the maximum fastest route (or shortest path) across the network given the current availability node values (removing edges that are connected to any given nodes that currently unavailable), (v) determining an updated set of availability variables (e.g., using a gradient descent approach, a branch-and-bound approach, a branch-and-cut approach, etc.), and (vi) continuing (iv) through (vi) until a convergence criterion is reached (minimum objective, max time, max iterations, etc.).

In one example, a universal approach for a cost function is constructed using the following algorithm, assuming that a graph $G=(V,E)$ is given and that there is an objective function, $f(V,E)$, that can evaluate a quantitative state of the logistics network for a metric of significance.

1. Initialize a node that should be removed, x, and a record of the inflicted change by removal, y.
2. Initialize a graph $G=(V,E)$ with vertices V and edges E representing the logistics network to be analyzed.
3. Initialize any information representing the logistics network on the vertices V and edges E. For example, if the logistics network is capacity-bound on either nodes or edges, then initialize the values for the capacities on the nodes, $c_u$, $u \in V$, and/or capacities on the edges, $c_{(u, v)}$, $(u, v) \in E$.
4. Initialize a new graph, $G'=(V',E')$, $V' \subseteq V, E' \subseteq E$, where the new vertices V' correspond to all vertices in V with only one node removed x', and E' consists of all edges in E except those touching the removed node x'.
5. Evaluate the objective function for the new modified graph, $f(V',E')$.
6. Evaluate the inflicted change by removal of the node: $y'=|f(V,E)-f(V', E')|$.
7. If y' is greater than the recorded greatest inflicted change, y, then set the selected node to remove as $x \leftarrow x'$ and greatest inflicted change as $y \leftarrow y'$.
8. Select a new candidate node, x', based on some criterion, and go to step 4.
9. Continue steps 4 through 9 until some termination condition is reached.

In the above example, different potential modified networks are cycled through and the objective function is evaluated for comparison to determine if one identifies a best node to remove. Criterion for update in step 8 can be performed in many different ways. One example includes stepping through all possible nodes, x'=u∈V, and evaluating all possible configurations. This would guarantee an optimal solution after all nodes are evaluated, but this approach requires exponentially larger compute resources as the logistics network increases. Another approach uses a heuristic that chooses a good candidate for the next removal candidate, x' (e.g., perhaps guessed by decreased ordering of a metric on all nodes). Yet another approach would be application of simulated annealing for the update.

To extend the above for removing multiple nodes, either approach could be run for a single node first, and then a subsequent best graph found provided as the new graph back into the same algorithm to determine a second best node, etc., or the step in 4 could be modified to select N nodes to remove from the network to determine the new candidate configuration G'=(V', E').

In still another example, a logistics network may be represented as a flow network, which is written in the following form for a graph G=(V, E) with vertices V and edges E, and assuming some capacity maximum $c_{uv}$, (u, v)∈E, on each edge:

$$\text{Maximize} \quad \sum_{v: (s,v) \in E} f_{sv} \quad \text{(Maximize the flow of units across the network.)}$$

$$\text{Subject to} \quad \sum_{(u,v) \in E} f_{uv} = \sum_{(v,u)} f_{vu} \quad \text{(Flow must be conserved across the network.)}$$

$$f_{uv} \leq c_{uv}, \forall (u, v) \in E \quad \text{(Flow cannot exceed the allowed capacity of each edge.)}$$

In this case, a similar algorithm is established to that described above to select a removal candidate x' and a corresponding new network configuration is represented as G'=(V', E'). In step 5, an inflicted change in the network configuration is calculated to maximize this quantity:

$$\max \left| \left( \sum_{v: (s,v) \in E'} f'_{sv} \right) - \left( \sum_{v: (s,v) \in E} f_{sv} \right) \right|$$

Here, $f'_{sv}$ represents a corresponding flow network across a candidate configuration G'=(V', E') with the node x' removed. Note that a maximum flow network problem is solved at each iteration of step 5. The above algorithm can be continued in a similar way seeking to find the single node x that shall maximize the above inflicted impact quantity.

There may additionally be other ways of formulating the above general algorithm to fit to other classes of graph/network representations of a logistics path as well. For example, when concerned only with a single unit of resources moving across factory and supply nodes in a logistics network, the can be represented as a shortest path problem instead. In this case, the above step 5 would once again be modified to calculate the shortest path across the modified candidate configuration network, and the inflicted change in the logistics network can be maximized or minimized, for example.

Figure 9:
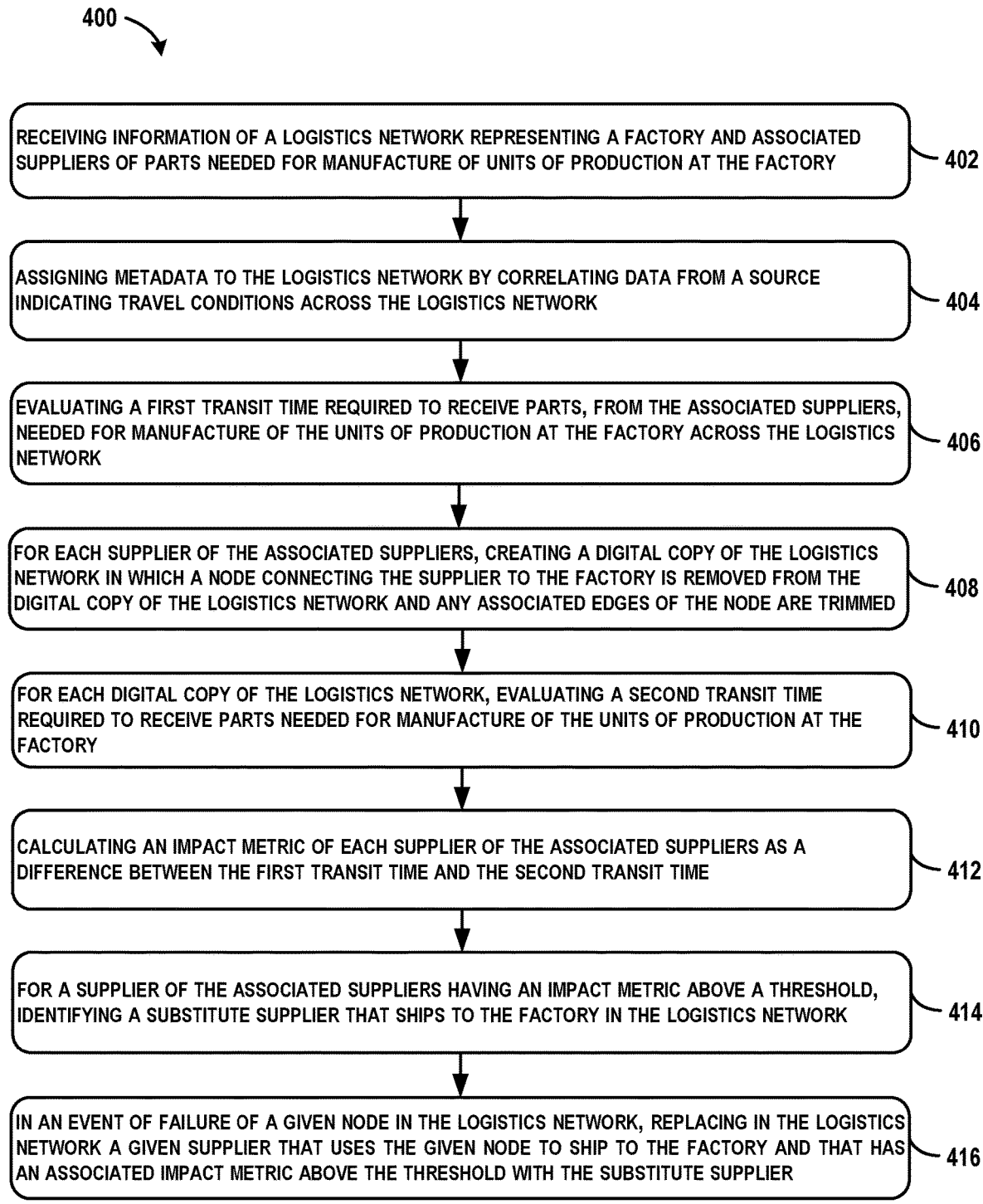
FIG. 9 shows a flowchart of an example of a computer-implemented method, according to an example implementation.

FIG. 9 shows a flowchart of an example of a computer-implemented method 400, according to an example implementation. Method 400 shown in FIG. 9 presents an example of a method that could be used with the system 100 shown in FIG. 1 or with the computing device 102 shown in FIGS. 1 and 2, for example. It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process.

At block 402, the method 400 includes receiving information of a logistics network representing a factory and associated suppliers of parts needed for manufacture of units of production at the factory, and the logistics network includes nodes and edges and wherein suppliers that ship to the factory are interconnected by the nodes and edges in the logistics network with the factory. In one example, the nodes of the logistics network comprise railway stations and the edges of the logistics network comprise tracks connections between the railway stations.

At block 404, the method 400 includes assigning metadata to the logistics network by correlating data from a source indicating travel conditions across the logistics network. In one example, the nodes and edges represent travel routes across the logistics network, and functions of block 404 include assigning traffic related data associated with the travel routes. In another example, the nodes and edges represent travel routes across the logistics network, and functions of block 404 include assigning weather related data associated with the travel routes.

At block 406, the method 400 includes evaluating a first transit time required to receive parts, from the associated suppliers, needed for manufacture of the units of production at the factory across the logistics network. In one example, the factory requires parts from multiple suppliers of the associated suppliers for manufacture of units of production at the factory, and the method 400 comprises evaluating the first transit time comprises evaluating the first transit time as a first time to receive parts from the multiple suppliers, and evaluating the second transit time comprises evaluating the second transit time as a second time to receive parts from the multiple suppliers.

At block 408, the method 400 includes for each supplier of the associated suppliers, creating a digital copy of the logistics network in which a node connecting the supplier to the factory is removed from the digital copy of the logistics network and any associated edges of the node are trimmed. In one example, the method 400 further includes for each supplier of the associated suppliers, iteratively creating multiple digital copies of the logistics network in which each successive digital copy has a different node connecting the supplier to the factory removed. In this example, functions of block 408 include calculating impact metrics for each supplier of the set of associated suppliers across the multiple digital copies of the logistic network, and for any suppliers having any impact metrics above the threshold, identifying a respective substitute supplier that ships to the factory in the logistics network. In further examples, functions of block 408 includes, in the event of failure of the given node in the logistics network, identifying candidate suppliers that use the given node to ship to the factory, and for the candidate suppliers that have an associated impact metric above the threshold, replace in the logistics network the candidate suppliers with their respective substitute suppliers.

At block 410, the method 400 includes for each digital copy of the logistics network, evaluating a second transit time required to receive parts needed for manufacture of the units of production at the factory.

At block 412, the method 400 includes calculating an impact metric of each supplier of the associated suppliers as a difference between the first transit time and the second transit time.

At block 414, the method 400 includes for a supplier of the associated suppliers having an impact metric above a threshold, identifying a substitute supplier that ships to the factory in the logistics network.

At block 416, the method 400 includes in an event of failure of a given node in the logistics network, replacing in the logistics network a given supplier that uses the given node to ship to the factory and that has an associated impact metric above the threshold with the substitute supplier.

In some examples, the method 400 also includes determining which single node of the logistics network, if unavailable, causes a largest increase in the first transit time.

Figure 10:
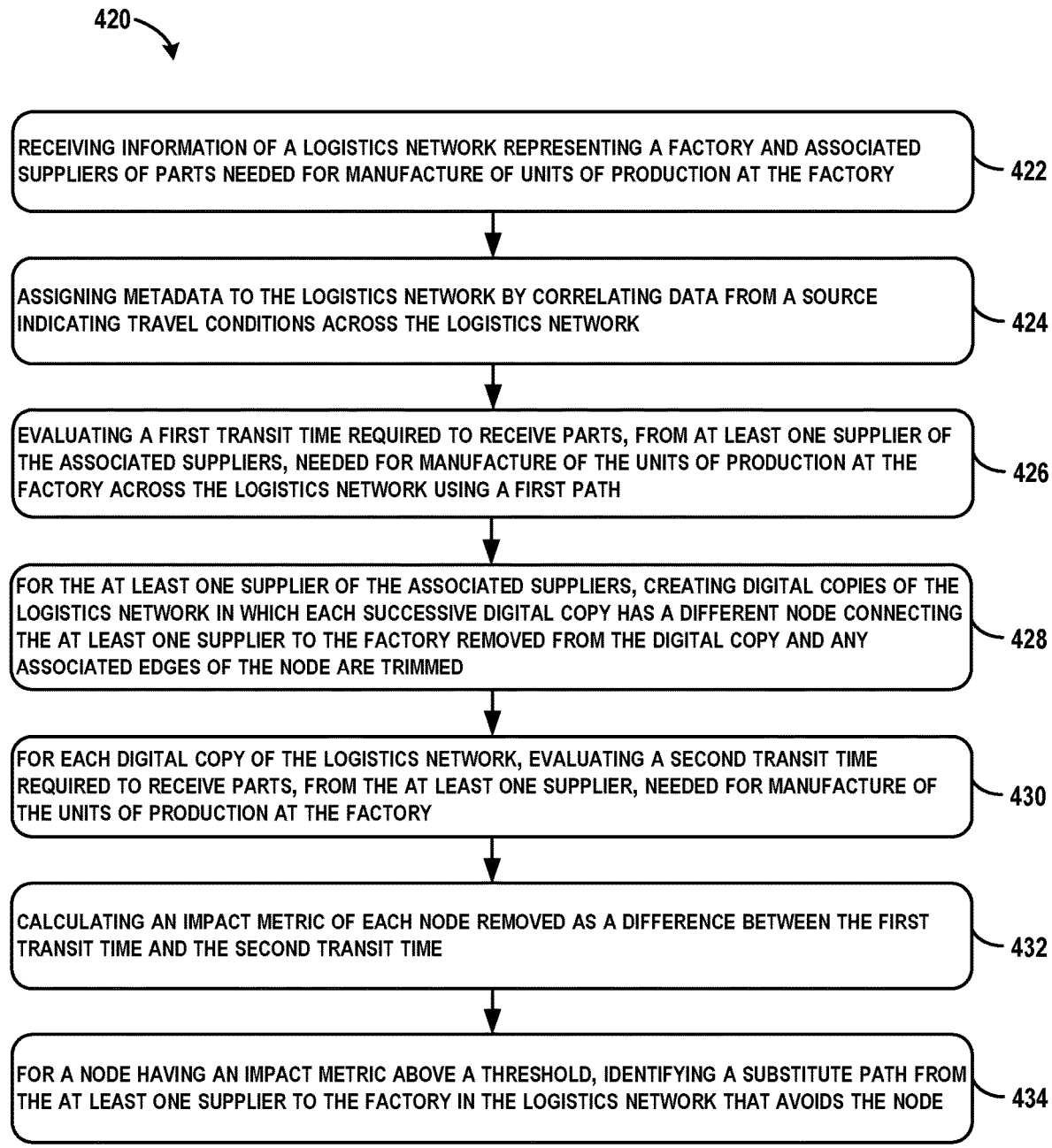
FIG. 10 shows a flowchart of another example of a computer-implemented method, according to an example implementation.

FIG. 10 shows a flowchart of another example of a computer-implemented method 420, according to an example implementation. Method 420 shown in FIG. 10 presents an example of a method that could be used with the system 100 shown in FIG. 1 or with the computing device 102 shown in FIGS. 1 and 2, for example. It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process.

At block 422, the method 420 includes receiving information of a logistics network representing a factory and associated suppliers of parts needed for manufacture of units of production at the factory, and the logistics network includes nodes and edges and wherein suppliers that ship to the factory are interconnected by the nodes and edges in the logistics network with the factory. In one example, the nodes of the logistics network comprise railway stations and the edges of the logistics network comprise tracks connections between the railway stations.

At block 424, the method 420 includes assigning metadata to the logistics network by correlating data from a source indicating travel conditions across the logistics network.

At block 426, the method 420 includes evaluating a first transit time required to receive parts, from at least one supplier of the associated suppliers, needed for manufacture of the units of production at the factory across the logistics network using a first path. In one example, functions of block 426 include evaluating the first transit time comprises evaluating the first transit time as a time required to receive parts, from multiple suppliers of the associated suppliers.

At block 428, the method 420 includes for the at least one supplier of the associated suppliers, creating digital copies of the logistics network in which each successive digital copy has a different node connecting the at least one supplier to the factory removed from the digital copy and any associated edges of the node are trimmed.

At block 430, the method 420 includes for each digital copy of the logistics network, evaluating a second transit time required to receive parts, from the at least one supplier, needed for manufacture of the units of production at the factory.

At block 432, the method 420 includes calculating an impact metric of each node removed as a difference between the first transit time and the second transit time. In one example, functions of block 432 include determining which single node of the logistics network, if unavailable, causes a largest increase in the first transit time, identifying candidate suppliers that use the single node to ship to the factory, and for the candidate suppliers, replace in the logistics network the candidate suppliers with a respective substitute supplier.

At block 434, the method 420 includes for a node having an impact metric above a threshold, identifying a substitute path from the at least one supplier to the factory in the logistics network that avoids the node.

In some examples, the method 420 additionally includes determining which single node of the logistics network, if unavailable, causes a largest increase in the first transit time.

In some examples, the method 420 additionally includes in an event of failure of the node in the logistics network, replacing in the logistics network the first path with the substitute path.

In some examples, the method 420 additionally includes for the multiple suppliers, creating associated digital copies of the logistics network in which each successive digital copy has a different node connecting the supplier to the factory removed from the digital copy and any associated edges of the node are trimmed, and evaluating the second transit time required to receive parts.

In some examples, the method 420 additionally includes for any respective nodes having associated impact metrics above the threshold, identifying a respective substitute path from the supplier to the factory in the logistics network that avoids the respective nodes.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A computer-implemented method, comprising:
   at a computing system, automatically receiving, over a computer network, logistics network data representing a factory and associated suppliers of parts needed for manufacture of units of production at the factory, wherein the logistics network data specifies nodes and edges of a logistics network, and wherein suppliers that ship to the factory are interconnected by the nodes and edges in the logistics network with the factory;
   assigning metadata to the logistics network data by correlating the logistics network data with real-time travel condition data received from an external data source over the computer network, the real-time travel condition data indicating travel conditions across the logistics network;

evaluating a first transit time required to receive parts, from the associated suppliers, needed for manufacture of the units of production at the factory across the logistics network based on the logistics network data and the metadata;

for each supplier of the associated suppliers, via a processor, iteratively creating multiple digital copies of the logistics network in computer storage, wherein in each successive digital copy, a different node connecting the supplier to the factory is removed from the digital copy of the logistics network and any associated edges of the removed node are trimmed;

for each digital copy of the logistics network, evaluating a second transit time required to receive parts needed for manufacture of the units of production at the factory;

calculating an impact metric of each supplier of the associated suppliers as a difference between the first transit time and the second transit time;

for a supplier of the associated suppliers having an impact metric above a threshold, identifying, via the processor, a substitute supplier that ships to the factory in the logistics network from a listing of substitute suppliers in the computer storage;

monitoring, via the processor and using the real-time travel condition data, aspects of the logistics network changing in real-time to dynamically update the listing of substitute suppliers in the computer storage; and in response to detecting a failure of a given node in the logistics network:
identifying, via the processor, an identified supplier associated with the given node and having an impact metric above the threshold; and
automatically replacing, via the processor, the identified supplier with a corresponding substitute supplier selected from the listing of substitute suppliers in the computer storage.

2. The method of claim 1, wherein the factory requires parts from multiple suppliers of the associated suppliers for manufacture of units of production at the factory, and wherein:
evaluating the first transit time comprises evaluating the first transit time as a first time to receive parts from the multiple suppliers; and
evaluating the second transit time comprises evaluating the second transit time as a second time to receive parts from the multiple suppliers.

3. The method of claim 1, wherein the nodes and edges represent travel routes across the logistics network, and wherein assigning the metadata to the logistics network data comprises assigning traffic related data associated with the travel routes.

4. The method of claim 1, wherein the nodes and edges represent travel routes across the logistics network, and wherein assigning the metadata to the logistics network data comprises assigning weather related data associated with the travel routes.

5. The method of claim 1, further comprising:
calculating impact metrics for each supplier of the set of associated suppliers across the multiple digital copies of the logistic network.

6. The method of claim 5, wherein for any suppliers having any impact metrics above the threshold, identifying a respective substitute supplier that ships to the factory in the logistics network.

7. The method of claim 6, wherein in the event of failure of the given node in the logistics network:
identifying candidate suppliers that use the given node to ship to the factory; and
for the candidate suppliers that have an associated impact metric above the threshold, replace in the logistics network the candidate suppliers with their respective substitute suppliers.

8. The method of claim 1, wherein the nodes of the logistics network comprise railway stations and the edges of the logistics network comprise tracks connections between the railway stations.

9. The method of claim 1, further comprising:
determining which single node of the logistics network, if unavailable, causes a largest increase in the first transit time.

10. A computer-implemented method, comprising:
at a computing system, automatically receiving, over a computer network, logistics network data representing a factory and associated suppliers of parts needed for manufacture of units of production at the factory, wherein the logistics network data specifies nodes and edges of a logistics network, and wherein suppliers that ship to the factory are interconnected by the nodes and edges in the logistics network with the factory;

assigning metadata to the logistics network data by correlating, via a processor, the logistics network data with real-time travel condition data received from an external data source over the computer network, the real-time travel condition data indicating travel conditions across the logistics network;

evaluating, using the processor, a first transit time required to receive parts, from at least one supplier of the associated suppliers, needed for manufacture of the units of production at the factory across the logistics network using a first path based on the logistics network data and the metadata;

for the at least one supplier of the associated suppliers, via the processor, iteratively creating multiple digital copies of the logistics network in computer storage, in which each successive digital copy has a different node connecting the at least one supplier to the factory removed from the digital copy and any associated edges of the removed node are trimmed;

for each digital copy of the logistics network, via the processor, evaluating a second transit time required to receive parts, from the at least one supplier, needed for manufacture of the units of production at the factory;

calculating, via the processor, an impact metric of each node removed as a difference between the first transit time and the second transit time;

for a node having an impact metric above a threshold, identifying, via the processor, a substitute path from the at least one supplier to the factory in the logistics network that avoids the node, based on the logistics network data and the metadata; and via the processor, monitoring aspects of the logistics network changing in real-time to update a listing of substitutes paths stored in computer storage.

11. The method of claim 10, further comprising:
determining which single node of the logistics network, if unavailable, causes a largest increase in the first transit time.

12. The method of claim 10, further comprising:
in an event of failure of the node in the logistics network, replacing in the logistics network the first path with the substitute path.

13. The method of claim 10, wherein evaluating the first transit time comprises evaluating the first transit time as a time required to receive parts, from multiple suppliers of the associated suppliers.

14. The method of claim 13, further comprising:
for the multiple suppliers, creating associated digital copies of the logistics network in which each successive digital copy has a different node connecting the supplier to the factory removed from the digital copy and any associated edges of the node are trimmed; and
wherein evaluating the second transit time required to receive parts comprises, for each associated digital copy of the logistics network, evaluating the second transit time required to receive parts.

15. The method of claim 14, wherein calculating the impact metric of each node removed as a difference between the first transit time and the second transit time comprises:
determining which single node of the logistics network, if unavailable, causes a largest increase in the first transit time.

16. The method of claim 15, further comprising:
identifying candidate suppliers that use the single node to ship to the factory; and
for the candidate suppliers, replace in the logistics network the candidate suppliers with a respective substitute supplier.

17. The method of claim 14, further comprising:
for any respective nodes having associated impact metrics above the threshold, identifying a respective substitute path from the supplier to the factory in the logistics network that avoids the respective nodes.

18. The method of claim 10, wherein the nodes of the logistics network comprise railway stations and the edges of the logistics network comprise tracks connections between the railway stations.

19. A non-transitory computer-readable media having stored therein executable instructions, which when executed by a computing device-system including a processor causes the computing system to perform functions comprising:
automatically receiving, over a computer network, logistics network data representing a factory and associated suppliers of parts needed for manufacture of units of production at the factory, wherein the logistics network data specifies nodes and edges of a logistics network, and wherein suppliers that ship to the factory are interconnected by the nodes and edges in the logistics network with the factory;
assigning metadata to the logistics network data by correlating, via the processor, the logistics network data with real-time travel condition data received from an external data source over the computer network, the real-time travel condition data indicating travel conditions across the logistics network;
evaluating, using the processor, a first transit time required to receive parts, from at least one supplier of the associated suppliers, needed for manufacture of the units of production at the factory across the logistics network using a first path based on the logistics network data and the metadata;
for the at least one supplier of the associated suppliers, via the processor, iteratively creating multiple digital copies of the logistics network in computer storage, wherein each successive digital copy has a different node connecting the at least one supplier to the factory removed from the digital copy and any associated edges of the removed node are trimmed;
for each digital copy of the logistics network, evaluating, via the processor, a second transit time required to receive parts, from the at least one supplier, needed for manufacture of the units of production at the factory;
calculating, via the processor, an impact metric of each node removed as a difference between the first transit time and the second transit time;
for a node having an impact metric above a threshold, identifying, via the processor, a substitute path from the at least one supplier to the factory in the logistics network that avoids the node, based on the logistics network data and the metadata; and
via the processor, monitoring aspects of the logistics network changing in real-time to update a listing of substitutes paths stored in computer storage.

20. The non-transitory computer-readable media of claim 19, further comprising:
for any respective nodes having associated impact metrics above the threshold, identifying a respective substitute path from the supplier to the factory in the logistics network that avoids the respective nodes.

* * * * *